Sept. 17, 1940.  F. L. MYERS  2,214,750
AIR FILTER
Filed March 3, 1937   2 Sheets-Sheet 1
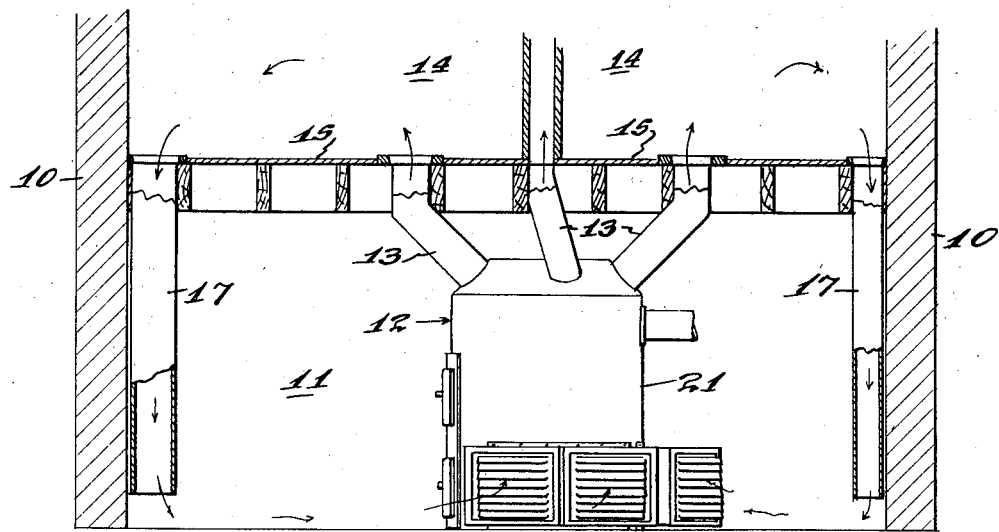
FIG-1-
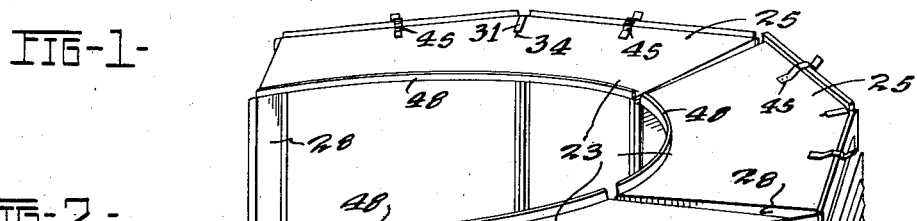
FIG-2-
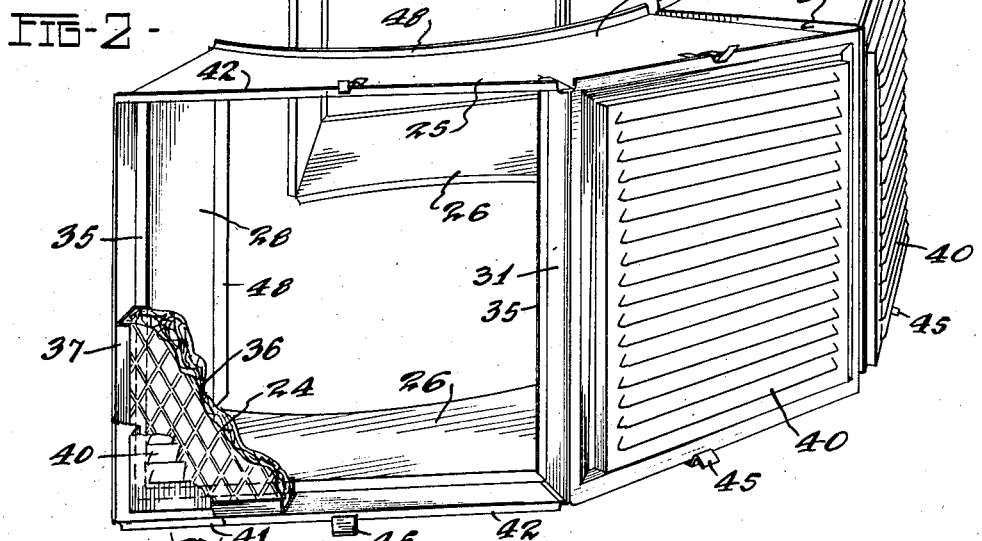
FIG-3-
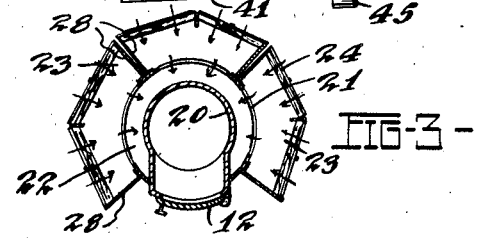
INVENTOR
Frank L. Myers
BY
Rule & Hoge ATTORNEYS Sept. 17, 1940.  F. L. MYERS  2,214,750
AIR FILTER
Filed March 3, 1937  2 Sheets-Sheet 2
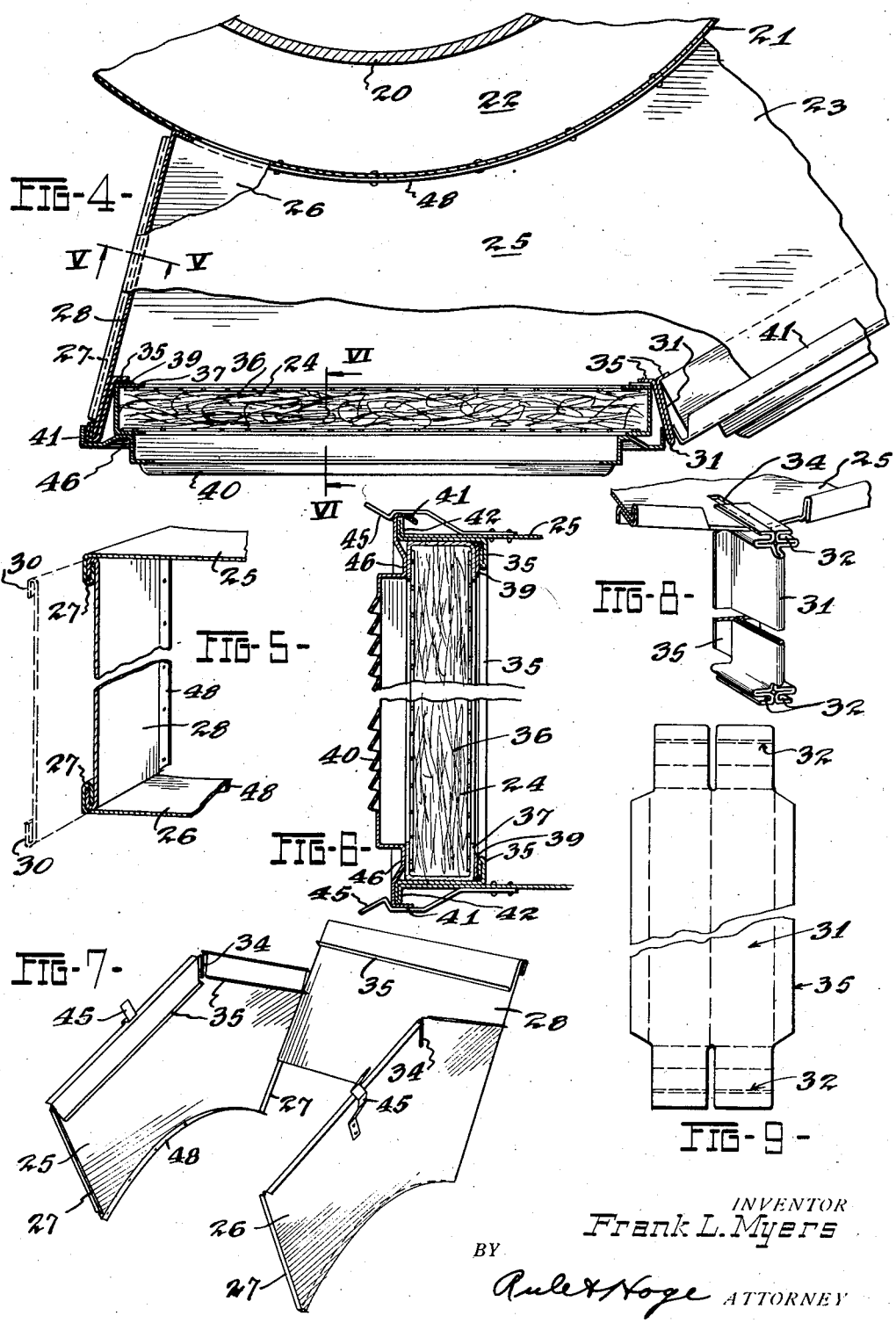
INVENTOR
Frank L. Myers
BY
Rule & Hoge ATTORNEY Patented Sept. 17, 1940

2,214,750

UNITED STATES PATENT OFFICE 2,214,750

AIR FILTER

Frank L. Myers, Toledo, Ohio, assignor, by mesne assignments, to Owens-Corning Fiberglas Corporation, a corporation of Delaware Application March 3, 1937, Serial No. 128,699

2 Claims. (Cl. 183—49)

The present invention relates to air filter systems designed for use particularly with warm air furnaces of the type in which the circulation of the heating air is controlled by gravity or other suitable means. The invention also relates in part to a novel arrangement of ducts used in connection with an air circulating system in buildings using warm air furnaces:

An object of the invention is to provide a novel and convenient construction and arrangement in which the air filter units, which are contained within the air circulating system, are easily and quickly removable and replaceable by other filter units and in which said units are fully protected and enclosed while in use.

Another object of the invention is the elimination of large return air pipes to the furnace, to the end of greater economy and to the end of freeing the basement or cellar of the house from congestion with large return pipes which take up considerable room and are unsightly. Moreover, by the elimination of the conventional cold air return pipes leading back to the furnace, friction and resistance, and accumulation of dirt within the pipes particularly at the bends thereof, are eliminated.

A feature of the invention is the provision of simple direct return air means which has a minimum of friction, inhibits the accumulation of dirt, saves space, and also prevents a backdraft to the rooms above.

Another object of the invention is the provision of a filter casing means in connection with a hot air furnace which provides even distribution of cold air to the furnace and to the periphery of the firepot, to the end of eliminating hot spots in the firepot castings and inefficient operation of the furnace. By eliminating hot spots, the furnace not only runs more efficiently but also lasts for a longer period of time before wearing out.

Another object of the invention is the provision of novel filter casing means which may be made in a single standard size adapted to be installed into any ordinary furnace for buildings regardless of its size. The hot air furnaces in general use are of various sizes, having heat output capacities in proportion to the grate areas. Different sizes of furnaces require different numbers of filter units in order to accommodate and filter efficiently all of the air which passes through the furnace. Moreover, unless an adequate number of filter units are provided, the air filtering job is incomplete and an excessive resistance is set up to the air flow. In general, it has been found that a filtering area of, at least, about five times the furnace rating, or total area of all warm air pipes, is required for effective and efficient filtering. Thus a feature of the present invention is the provision of a novel design filter casing or boot which may be installed in any desired furnace and made to hold the requisite number of filter units for the particular grate area or rating of the furnace.

Another feature of the present invention is the provision of a novel design filter casing or boot which is adapted to be knocked down, packed into a small convenient package, and reassembled on location, with a minimum of difficulty or mechanical skill.

Other objects and advantages of the present invention will become apparent from the following description taken in conjunction with the drawings, in which:

Fig. 1 is a fragmentary elevational section view of a building in which my novel air return and filtering system has been installed;

Fig. 2 is a perspective view, having certain parts broken away for the sake of clarity, of my novel filter boot which is adapted to be installed into a conventional warm air furnace;

Fig. 3 is a diagrammatic cross-sectional plan view illustrating the arrangement of my filter boot around a furnace in order to insure maximum distribution of air to the fire-pot of the furnace;

Fig. 4 is a fragmentary cross-sectional plan view of a furnace having my novel filter boot installed in connection therewith;

Fig. 5 is a fragmentary elevational cross-sectional view of the filter boot shown in Fig. 4, the section being taken along lines V—V of Fig. 4;

Fig. 6 is a fragmentary cross-sectional side view of a portion of the filter boot and filter unit shown in Fig. 4, the section being taken along the lines VI—VI of Fig. 4;

Fig. 7 is a perspective view of a portion of the filter boot illustrating the method of assembling the parts forming the side walls of the casing;

Fig. 8 is a fragmentary perspective view of a dividing post as it is being installed into the top panel of my novel filter boot; and Fig. 9 is a fragmentary plan view of a blank of sheet metal which is adapted to be folded along the dotted lines indicated to form the dividing post for my filter boot as shown in Fig. 8.

Referring more particularly to Fig. 1, reference character 10 designates the walls of a building and more generally those of a home using a warm air heating system. In the basement 11 of the home is a conventional warm air furnace 12 having the warm air pipes or ducts 13 leading out of the upper portion of the furnace 12 to the rooms 14 above, through the floors or walls 15 of the building. The warm air circulates up through the warm air pipes 13 into the room 14 and when they have delivered up their heat to the rooms, the cooled air returns to the basement through the cold air return pipes 17.

The cold air return pipes 17 are preferably perpendicular and straight, without bends or elbows, and lead the air directly from the rooms above to within a short distance of the floor of the basement. The exact distance between the floor and the discharge end of the cold air pipe 17 may vary although I have found that a distance of from six inches to about twelve inches is preferable. With this arrangement I have achieved certain definite advantages. By eliminating the cold air pipes which lead directly into the furnace casing, I have greatly increased the available space in the basement and have avoided cluttering up the room with large and unsightly pipes. Moreover, elbows and bends in the cold air return pipes have been eliminated with the result that accumulation of dirt and consequent fire hazard has also been eliminated. Moreover, the resistance to air flow has also been greatly reduced by eliminating the maze of cold air return pipes which have been in use heretofore. As a result the furnace efficiency has been largely increased and it is now possible to supply warm air to all of the rooms of the house including those most remote which have heretofore had difficulty in obtaining enough heat from the furnace.

Moreover, by providing a cold air return pipe which has its discharge end near the floor of the basement, I have facilitated the flow of air in the proper direction down through the cold air pipes. With this arrangement the air is discharged into a quiet zone near the floor of the furnace, where less turbulence of air is present. Moreover, the air near the floor of the furnace is generally cooler, and accordingly will have less tendency to cause a back flow up through the discharge pipes 17. When the air is returned directly into the basement through a conventional register in the floor 15, the air would enter into a warmer and more turbulent air zone in the cellar, and accordingly there would be an increased tendency for the air to flow up through the register into the rooms above rather than be returned down into the basement. Furthermore, my novel return pipe permits smaller registers to be distributed in the rooms of the house, and these may now be made so small that they may be installed in the base-board of the walls.

In addition, in case of basement fire, flames or smoke cannot be drawn up the perpendicular return air duct because it extends below the normal cold air stratum which generally prevails to about sixteen and one-half inches above the basement floor level.

The firepot 20 of the furnace 12 is surrounded by a cylindrical casing 21, providing a warm air chamber 22 (see Fig. 3). The air is admitted into the chamber 22 around the periphery of and at the base of the said chamber through ports in the casing 21. Mounted around the periphery at the base of the casing 21 are my novel air filter boots 23, each adapted to hold one or more filter units 24. The air boots 23 may all be constructed substantially alike and be of a standard size, which may be adapted to be fitted to any of the standard warm air furnaces regardless of its size. For large furnaces requiring a greater amount of filter area, a larger number of air boots 23 may be installed, and for smaller furnaces a smaller number of boots may be installed.

Each of the boots 23 comprises top and bottom panels or plates 25 and 26 respectively, each of which is provided with marginal slides or slots 27 extending along the edges thereof and radially from the casing 21. These slots are adapted to receive the end panels or walls 28 which may be slid into place and inserted as illustrated in Fig. 7.

The top and bottom edges of the side walls 28 are preferably overlapped to form lips 30 (see Fig. 5) adapted to be received by and mate with the slots 27 in the top and bottom members 25 and 26 respectively. With such a construction a tight fitting air seal is provided.

The boot 23 is preferably designed to hold a plurality of air filter units, and for this purpose upright dividing posts 31 may be provided, one of which is illustrated with more particularity in Fig. 8. Each post 31 may be formed of a blank sheet of metal, which has been stamped as illustrated in Fig. 9 and then folded along the indicated dotted lines to provide channels 32 at the top and bottom ends thereof. These channels 32 are adapted to receive the free edges of the top and bottom members 25 and 26 which are formed by slots 34 therein.

Along the front face of the boot 23 and formed in the members 25, 26 and 28, are inwardly extending flanges 35 defining individual cells which are adapted to receive individual air filter units 24. The filter units may be rectangular in shape, as shown, and each unit preferably comprises a pad 36 of filtering material within an open-work cover or container 37. The specific construction of the individual filter unit is not a part of the present invention and need not be set forth in detail herein. The filtering medium may be composed of any suitable permeable material such as glass wool, metal wool, hair, open mesh metal, or paper, or other suitable materials covered with a conventional filter adhesive. The container 37 preferably rests uniformly against the flanges 35 to form a uniform air seal therewith. In order to enhance the sealing qualities at these points, a gasket 39 (see Fig. 6) may be installed between the container 37 and the flange 35.

Overlying the front face of the filter unit, and forming a protective cover therefor, although admitting an adequate quantity of air with a minimum resistance, is a louvered door 40. Around the outer margins of the door 40 are inwardly extending flanges 41 adapted to fit over the edges or flanges 42 of the boot 23 and form a snug fit therewith. The upper flange 41 of the door 40 is preferably bent or hooked over a suitable degree to overhang the upwardly extending flange 42 of the top member 25. Snap clamps 45 may be secured to the upper and lower members 25 and 26 and extend outwardly to secure the flanges 41 and the doors in place.

The door 40 may also be provided with a bearing 46 formed as a partial reentrant surface in register with the margins of the filter unit 24. Such a construction insures adequate pressure of the filler unit against the flange 35, and a good seal around the edges thereof.

The rear margins or inwardly projecting free edges of the boot 23 may be left blank when originally fabricating the unit prior to installation.

Sufficient sheet material, however, should be provided to permit it to be adapted to any size casing 21 desired. When the boots are to be installed, the inner edges may be cut out with the required radius of curvature corresponding to the particular size of the casing 21 to which the boot is to be attached. After the inner edges of the boot have been cut out to size, they may be turned up to provide marginal flanges 48 which may then be juxtaposed to the casing 21 and fastened thereto by any suitable means such as bolts, screws, rivets, soldering or the like. It is also possible to cut out the inner edges and form the flanges 48 originally when fabricating the boot, and thus render the boot immediately adapted to be applied to a particular size furnace casing.

Modifications and variations may be resorted to without departing from the spirit and scope of the present invention as defined in the appended claims.

I claim:

1. An air filter boot for use in a filtering system, said boot comprising horizontal top and bottom members with inner edges extending in an arc of a circle, and attached vertical side members extending radially of the arc, a filter unit, and means extending vertically along the outer edges of said side members for receiving said filter unit, said unit being substantially vertical and parallel with the chord of said arc.

2. An air filter boot for use in a filtering system, said boot comprising horizontal top and bottom members with inner edges extending in an arc of a circle, and attached vertical side members extending radially of the arc, a filter unit, means extending vertically along the outer edges of said side members for receiving said filter unit, said unit being substantially vertical and parallel with the chord of said arc, and louvered door overlying the outer surface of each of said filter units to cover and protect said unit, and means for securing said door to said members.

FRANK L. MYERS.